United States Patent
Suttle et al.

(10) Patent No.: US 6,302,677 B1
(45) Date of Patent: Oct. 16, 2001

(54) APPARATUS FOR CONTINUOUSLY MOLDING CHOCOLATE PRODUCTS

(75) Inventors: James M. Suttle, East Stroudsburg, PA (US); John M. Martin, Glendale, CA (US); Neil A. Willcocks, Flanders; Alfred V. Camporini, Hackettstown, both of NJ (US); Thomas M. Collins, Nazareth, PA (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 09/774,696

(22) Filed: Feb. 1, 2001

Related U.S. Application Data

(62) Division of application No. 09/570,260, filed on May 12, 2000, now Pat. No. 6,217,927.

(51) Int. Cl.[7] .................................. A23G 7/00; A23P 1/00
(52) U.S. Cl. ......................... 425/373; 425/200; 425/362; 425/407
(58) Field of Search ...................................... 425/362, 363, 425/373, 407, 220; 426/512, 515, 660

(56) References Cited

U.S. PATENT DOCUMENTS

| 4,059,378 | 11/1977 | Sollich | 425/362 |
|---|---|---|---|
| 5,382,149 | * 1/1995 | Yates et al. | 425/363 |
| 5,409,722 | 4/1995 | Binley | 426/515 |
| 5,935,613 | * 8/1999 | Benham et al. | 425/362 |

FOREIGN PATENT DOCUMENTS 2 332 387   6/1999   (GB) .

* cited by examiner

*Primary Examiner*—George C. Yeung
(74) *Attorney, Agent, or Firm*—Fitzpatrick, Cella, Harper & Scinto

(57) ABSTRACT

Methods for continuously molding finished chocolate tablets, pieces and the like are disclosed. Apparatus for use with the method, comprise a chilled rotating mold having at least one recess into which liquid chocolate is deposited. Liquid chocolate, is held in place by a retaining/casting belt as the rotating mold turns. The liquid chocolate cools and partially sets while in contact with the rotating mold and retaining/casting belt, and a molded chocolate is removed from the recess. Novel finished chocolate molded products made by the methods and with the apparatus, having detailed surface design and surface gloss are also disclosed.

5 Claims, 3 Drawing Sheets

APPARATUS FOR CONTINUOUSLY MOLDING CHOCOLATE PRODUCTS

This application is a divisional of U.S. application Ser. No. 09/570,260, filed on May 12, 2000, now U.S. Pat. No. 6,217,927.

BACKGROUND OF THE INVENTION

1. Field of the Invention

The invention relates to the molding of chocolate. Specifically, the disclosed method and apparatus are directed to the continuous molding of chocolate tablets, pieces and the like on a rotary mold.

2. Discussion of the Related Art

Finished chocolates having a desired three-dimensional shape or having an image or design imprinted on a surface are conventionally produced by molding, and are herein referred to as "molded chocolate". The finished chocolate may be a solid block, a hollow shell, or a shell filled with a confectionery material such as fondant, fudge or soft caramel (*Chocolate, Cocoa and Confectionery: Science and Technology* by Bernard W. Minifie, Third Edition, page 183, herein incorporated by reference in its entirety). Whatever the particular form of the finished chocolate, all are characterized by attributes such as detailed finishes and high surface gloss. Further, these finished chocolates do not require further processing such as enrobing with chocolate, which only provides a home-made look to a product and lacks high gloss and fine surface detail.

Conventional molding typically employs very large numbers of molds, usually made of polycarbonate. These polycarbonate molds are typically flat, approximately 1 inch in height and anywhere from 1 to 2 feet long and 1 to 5 feet in width.

The equipment employed to manipulate and process these molds is very large and among the most complex and expensive of all confectionery production equipment. Mold changeover and mold tooling are also expensive and often make it costly to produce a large variety of shaped chocolate products.

In the typical conventional molding process a chocolate mixture is initially melted at temperatures of about 45° C. and tempered by cooling with agitation to about 29° C. to 30° C. to produce a tempered chocolate. The tempering of the chocolate causes a very small percentage of the fat to form seed crystals which results in a dispersion of these seed crystals throughout the liquid fat phase of the liquid chocolate. The liquid tempered chocolate is then deposited into a polycarbonate mold. The mold is shaken to remove air bubbles and to distribute the chocolate in the mold cavity. These steps are critical to reproducing the detail of the mold surface and to obtaining a glossy finished product surface. Indeed, if the chocolate viscosity is too high or has become significantly partially solidified, the resultant finished chocolate product appearance will be poor. Defects such as air bubbles on the surface, poor gloss and poor or incomplete surface detail are encountered. Thus, to properly mold finished chocolates, it is essential that the final chocolate structure is only developed after filling the molds (i.e., the chocolate must still be liquid when the chocolate is deposited into the molds.)

The mold and chocolate are then cooled and the chocolate hardened, and finally, the set, shaped chocolate is removed from the mold. Removing the chocolate from the mold usually involves turning the molds upside down and deforming them slightly, or striking the mold so that the molded chocolate falls out under its own weight.

These methods place limitations on the size, shape and finish of the final product, and on production efficiency. Conventional chocolate molding processes are among the slowest confectionery production processes for the amount of equipment and space involved. A good production rate would be about 15–20 molds per minute, very good about 20–25 molds per minute and excellent about 25–30 molds per minute. To achieve these high levels of production requires great attention to the process.

Another significant limitation to the molding of finished chocolate products is related to the size of the products. It has long been known in the art that small molded chocolate pieces, on the order of 0.5 grams and smaller, cannot be reliably demolded and this has had the practical effect of limiting confectioners to relatively larger pieces. This problem results from the ratio of surface area in contact with the mold to the mass of the piece being too high in these small pieces. Demolding processes essentially rely on gravity to help remove the pieces from the molds. This is true even in cases where molds are tapped or hammered and in cases where flexible molds might be employed. The smaller mass of a small chocolate piece means less gravitational force to overcome the attractive forces holding the piece into the mold. Thus, a process which provided for continuously molding very small finished chocolate pieces or the like would be a highly desirable advancement in the art.

Processes for continuously molding food products have been disclosed in the prior art, but these processes do not provide for the production of finished molded chocolate.

U.S. Pat. No. 4,059,378, for example, discloses a method of continuously molding chocolate centers, hot sugar masses, fudge, whipped or unwhipped chewing or nougat mass, candy cream and the like which avoids the need for an extruder. These "center" materials are not subject to the same functional requirements as molded chocolate. There is no disclosure of feeding liquid chocolate to the recesses on the mold, and as a practical matter the invention is limited to center manufacture.

The methods and apparatus described in U.S. Pat. No. 4,059,378 do not provide a means to continuously set and mold chocolate tablets, pieces, or the like because the process will not provide an appropriate finish or texture of a finished molded chocolate piece.

Significant functional requirements are demanded of molded chocolate that are not required of centers. The surface of molded chocolate must typically have detailed surface design and glossy finish. The formation of a suitably solidified design with an appropriately glossy finish cannot be performed in a shaping apparatus such as described in U.S. Pat. No. 4,059,378. The apparatus and method of U.S. Pat. No. 4,059,378 are specifically directed towards the molding of confectionery masses, such as the centers or nougat masses and the like specifically noted in the patent. The apparatus and method utilize essentially set confectionery masses, which are then formed by means of an "intake cylinder being operable to press the mass into the molding recesses of the molding cylinder". Clearly the masses are substantially set or solidified, and the patent emphasizes the need for a "gentle molding process which does not impair the original structure of the mass".

By clear contrast, molding processes for finished molded chocolate pieces require the use of liquid chocolate which flows readily into mold cavities and does not have structure. It is the ability of liquid chocolate to flow into mold cavities which ensures good surface detail, good gloss and proper final product texture (i.e., good "snap").

Published U.K. Patent Application GB 2,337,387 A describes a method and apparatus for molding food articles. In this method, chocolate halves simultaneously formed in two discrete rollers are pressed together and united in the "nip" between the two rollers. This invention is a further refinement of the long-known technique of roll-forming centers which typically are further processed by panning to apply chocolate coatings or hard sugar shell coatings. The product of these mold-forming techniques does not provide the high quality attributes of finished molded chocolate pieces. In fact, the product of GB 2,337,387 is a sheet of chocolate articles connected by a continuous web of chocolate which must be removed in an abrasive process known as deflashing. The deflashing process abrades the surface finish of the chocolate articles leaving a rough unfinished appearance. The result is a complex feeding and removal mechanism of uncertain utility.

Other processes describe molding of finished chocolates but do not employ rotary techniques. For example, published International Application WO98/30111, the entire disclosure of which is incorporated herein by reference, describes methods for shaping chocolate products which involve contacting a chocolate composition with a chilled forming device. This application does not describe continuous molding on a rotary mold.

SUMMARY OF THE INVENTION

The inventors herein have discovered a method for continuously molding finished chocolate pieces which comprises:

(a) feeding liquid chocolate into a recess in the surface of a cooled rotating mold having an interior cavity;

(b) providing a coolant having a temperature less than about 10° C. to said interior cavity to lower the temperature of said recess;

(c) containing the liquid chocolate in the recess with a retaining/casting belt that maintains the liquid chocolate in the recess until the liquid chocolate sets to become at least partially solidified molded chocolate; and (d) removing the molded chocolate from the recess.

The ratio of surface area of the chocolate in contact with the cooled rotating mold to the surface area of chocolate in contact with the retaining/casting belt is generally less than about 4.5:1. Preferably, this ratio is less than about 3.5:1, more preferably less than about 3:1 and most preferably less than about 2:1.

In one aspect, the method of the present invention comprises allowing the liquid chocolate to contact a cooled recess in a rotating mold for a period of time such that the surface of the chocolate sets sufficiently, and the piece can be efficiently removed from the rotating mold, while an interior portion of the chocolate piece remains more fluid until after the chocolate piece is removed from the rotary mold. In another aspect, the method of the present invention provides the means for producing small finished molded chocolate pieces in a reliable and efficient manner. The setting of the chocolate while in contact with the retaining/casting belt creates a strong attractive force between the chocolate piece and the belt. As the retaining/casting belt separates from the rotary mold, this force effectively demolds the small piece.

An apparatus for continuously molding chocolate products according to the invention comprises: a substantially cylindrical rotary mold having an interior cavity and having at least one recess on an exterior radial surface portion of the rotary mold. The rotary mold rotates as coolant is provided to its interior cavity maintaining the temperature on a surface of the recess to a temperature approaching the temperature of the coolant, less than about 10° C. As the mold rotates, a feeder deposits liquid chocolate into said recess; and a retaining/casting belt positioned to maintain the liquid chocolate deposited in said recess moves in unison with the rotational motion of the rotary mold. The opening of the recess has an area, and the ratio of surface area of the chocolate in contact with the cooled rotating mold to the surface area of the chocolate in contact with the retaining/casting belt is less than about 4.5:1, preferably less than 3.5:1, more preferably less than 3:1 and most preferably less than 2:1. It is expected that the higher ratios would require increasing the cooling time on the rotary mold, or using lower cooling temperatures. To permit removal of the molded chocolate from the recess, a sidewall of said recess makes an angle of greater than about 7 degrees with respect to a line perpendicular to the radial surface of the rotary mold. Additionally, as the liquid chocolate solidifies in contact with the retaining/casting belt, it is essentially cast into the surface contours of the belt, providing a transient bonding of the chocolate to the belt, allowing easy demolding.

DETAILED DESCRIPTION OF THE PREFERRED EMBODIMENTS

The term "chocolate" is intended to refer to all chocolate or chocolate-like compositions with a fat phase or fat-like composition. As the invention is directed in certain aspects to the control of the characteristics of the fat or fat-like phase of the chocolate, rather than the non-fat materials within the chocolate, the term is intended to include all chocolate and chocolate-like compositions. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions, unless specifically identified otherwise.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions which fall outside the specified ranges of the standardized chocolates.

Chocolates also include those containing crumb solids or solids fully or partially made by a crumb process.

Nonstandardized chocolates result when, for example, the nutritive carbohydrate sweetener is replaced partially or completely; or when the cocoa butter or milkfat are replaced partially or completely; or when components that have flavors that imitate milk, butter or chocolate are added or other additions or deletions in formula are made outside the FDA standards of identify of chocolate or combinations thereof.

For use with the apparatus disclosed herein, the only requirement of the chocolate is that it be liquid and (if the chocolate is a tempering system) tempered as it is fed to the rotary mold.

Figure 1:
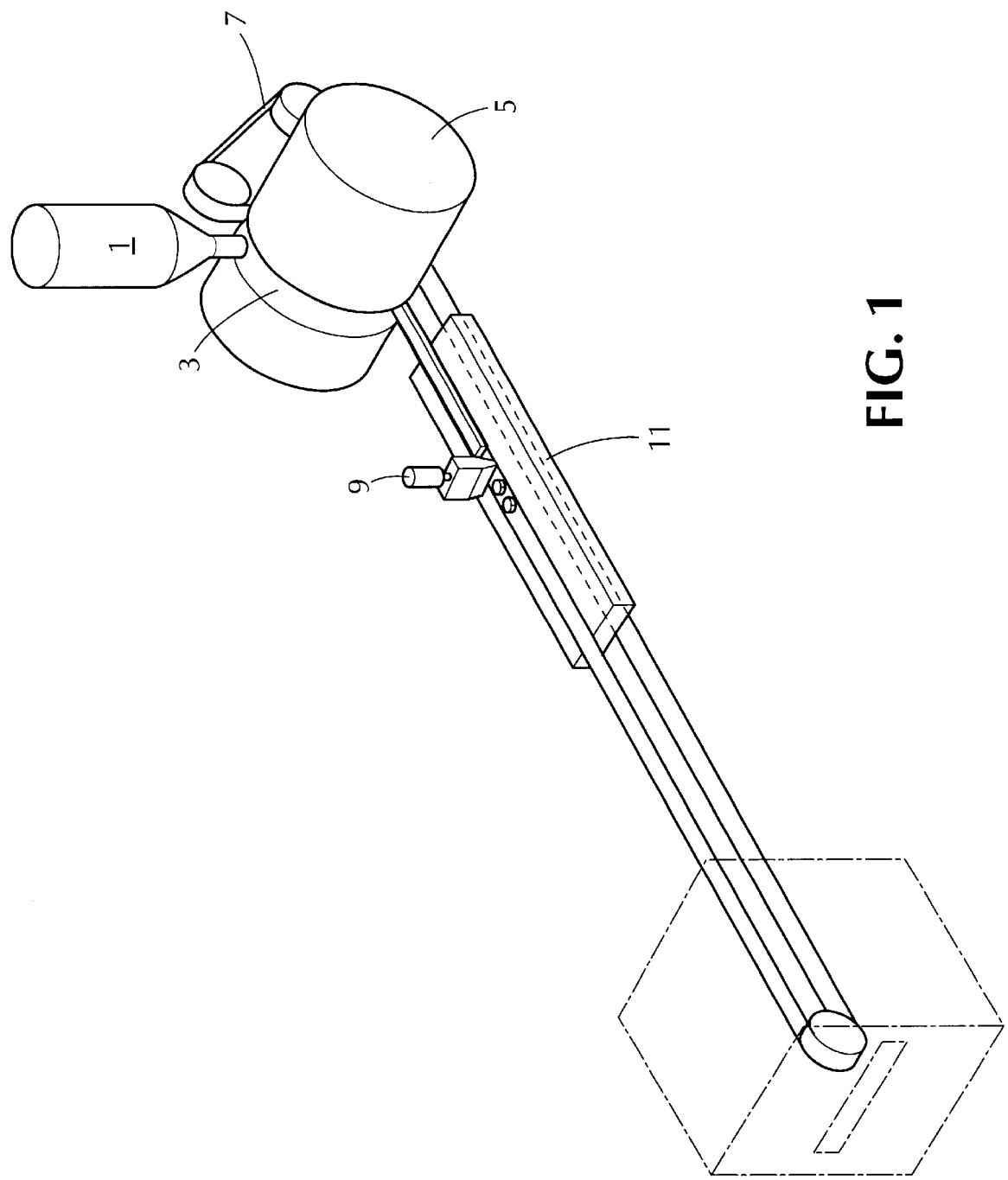
FIG. 1 depicts an apparatus according to an embodiment of the invention.

As shown in FIG. 1, the liquid tempered chocolate is pumped from chocolate feed 1 into recess 3 on rotating hollow mold 5 at the top of the rotating hollow mold 5. The mold is, generally speaking, cylindrical. The "top" of rotary mold 5 means the top half of the rotary mold 5. Preferably, the feed will be located at a position between 10 o'clock and 2 o'clock with respect to the rotary mold. Most preferably, chocolate will be fed into the recess directly above the mold, i.e. at the 12 o'clock position, as shown in FIG. 1. A second feeder can be provided to co-deposit materials in the recess with the liquid chocolate.

The recess may be one continuous groove, as shown in FIG. 1, in which case the resulting molded chocolate would be removed from the rotary mold in one continuous strip, or discrete recesses can be provided, resulting in discrete molded chocolate pieces.

The surface of the recess 3 is cooled, for example with a coolant provided in the interior of rotating mold 5. In preferred embodiments, the coolant is propylene glycol, although a commercial coolant such as Syltherm®, available from Dow Chemical, or even a brine solution could also be used. Preferably, coolant continuously circulates through the system. Additionally, coolant may be provided in an area proximate the retaining/casting belt, for example in a cavity underneath the retaining/casting belt as further described below. If cooling through the retaining/casting belt is desirable, the belting material can be chosen from among materials having higher thermal conductivity.

The surface of the recess 3 and the rotating mold 5 are both preferably made of metal to enable better heat transfer from the liquid chocolate to the coolant. For example, mold 5 may be of polished aluminum, nickel-plated steel, chromium-plated copper, silver plated copper, or other material. The specific material is not particularly limited, provided that the surface of the recess can be maintained reliably at the desired temperature that is, at a temperature approaching that of the coolant. Working embodiments have used an 8 inch diameter aluminum wheel polished to an 8 micron finish, however, the size can vary depending upon the size of product and the rate of production required.

The surface of the recess is generally smooth, although portions of the surface may be etched or machined to make a design which will be impressed or raised on the finished chocolate product. In a preferred embodiment the recess is a continuous groove, which may have a design, and the chocolate product that is removed from the belt is a continuous strip, which may then be cut into discrete pieces by a guillotine cutter 9.

Liquid chocolate is fed into recess 3 at a temperature between about 27° C. and about 32° C., most preferably at about 30° C. At this temperature, tempered chocolate will have the required fluidity for chocolate molding.

Figure 3:
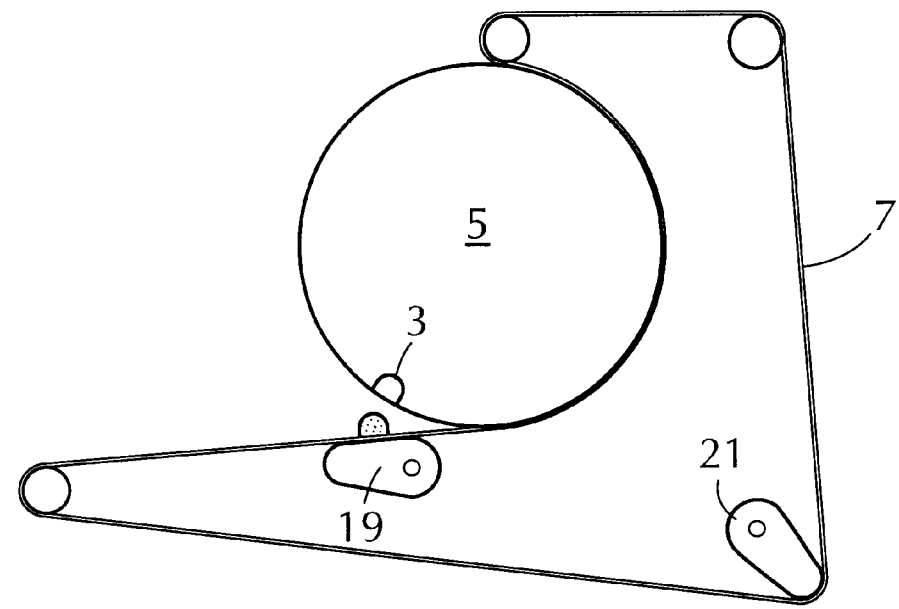
FIG. 3 depicts a system of cams in cooperation with the rotary mold and retaining/casting belt according to an embodiment of the invention in a state wherein a molded chocolate piece has been removed from the wheel.
Figure 4:
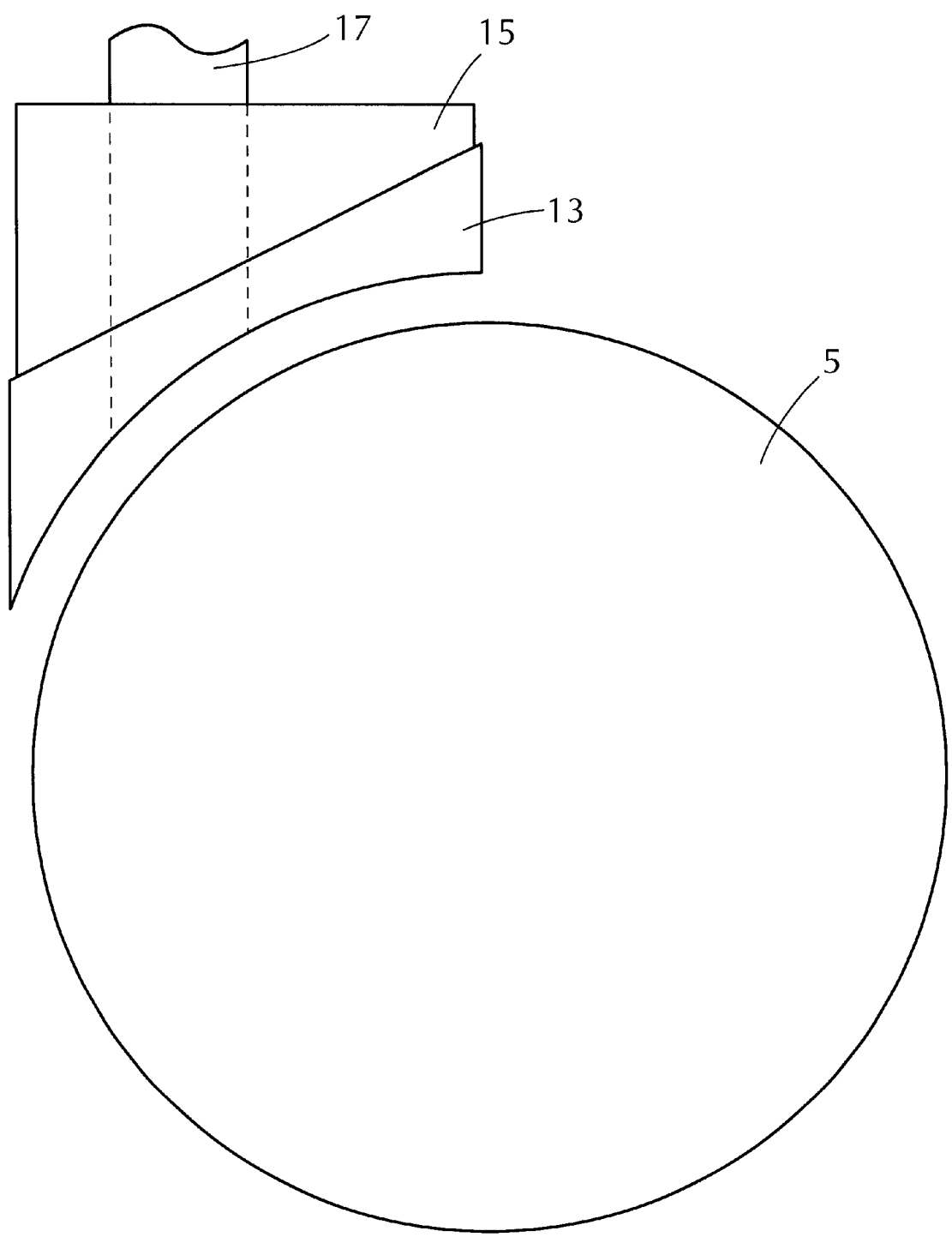
FIG. 4 depicts a shoe used to feed liquid chocolate into a recess according to an embodiment of the invention.

In preferred embodiments, as shown in FIG. 3, a "shoe" is provided between the feeder and the rotary mold to facilitate the feeding of liquid chocolate to the recess. The shoe comprises a body 15, typically made of a metal, such as aluminum. The body is attached to contact surface 13, which may be made of a low friction material, for example, Teflon® (polytetrafluoroethylene). The contact surface is in contact with the rotary mold in a sealing relationship. In FIG. 4, the contact surface is shown separated from the rotary mold to allow a clearer view. Liquid chocolate is fed through sanitary fitting 17 into the recess. The use of a shoe in this manner avoids the necessity of having to meter precise amounts of liquid chocolate into the recesses as the rotary mold rotates.

The chocolate cools and partially solidifies in contact with the rotating mold. The temperature of the surface of the rotary mold is maintained by providing a coolant to an interior cavity of said rotary mold having a temperature between about −40° C. and about +10° C., and preferably between about −20° C. and about +5° C., and most preferably between about −5° C. and about 0° C. Preferably, the surface of the molded chocolate solidifies allowing the chocolate to achieve sufficient integrity for removal from the rotary mold, while the interior of the molded chocolate may remain more fluid.

To obtain the glossy surface that is typically demanded of a finished molded chocolate piece, the chocolate must be liquid when it is poured into the mold to obtain the required smooth surface.

In some embodiments it is be desirable to perform transient heating of the recess 3 just prior to depositing liquid chocolate into the recess. Heating, such as with a stream of hot air, an infra-red heater, or other means known to those of skill in the art, is sufficient to raise the surface temperature of the recess temporarily to about 5° C., 10° C., 15° C. or 20° C., as desired. Warming the recess in this manner can improve surface gloss of the molded chocolate. In another embodiment of the invention, where non-tempering chocolate is being molded the non-tempering chocolate can be introduced at a higher temperature to improve the gloss of the finished molded chocolate. This also helps to maintain chocolate fluidity during the molding process.

The time allowed for the chocolate to cool and solidify to a point where it can be removed from the rotary mold is determined by the size of the mold, the speed at which it turns, the volume of chocolate in the recess, the surface temperature of the recess, and the rate of heat transfer from the chocolate as it cools and solidifies. Generally, between about 20 and about 60 seconds is necessary to partially set the chocolate, preferably between about 25 and about 50 seconds, most preferably between about 30 and about 45 seconds.

Thus, the size of mold 5 is itself not particularly critical, provided that the chocolate has sufficient time to become sufficiently solidified. The size of the wheel and its speed of rotation may be adjusted to provide a partially set chocolate to be removed from the rotary mold.

As the mold rotates, the recess is partly covered with a retaining/casting belt 7 that tracks and runs in unison with the rotating mold 5. While the mold preferably rotates continuously in unison with the retaining/casting belt, the mold and belt may also rotate in a uniform interrupted manner with liquid chocolate only being fed to the mold during the rotational period. The retaining/casting belt acts as a containment device to retain the liquid chocolate in the recess of the mold while it sets and casts to the belt. The belt may be made of, for example, plastic, fiber-plastic composite or metal. The retaining/casting belt may be cooled by providing a continuously circulating coolant to cavity 11 below the retaining/casting belt at a portion of the belt positioned downstream of the rotary mold. The retaining/casting belt may also be machined or etched to provide a design on the surface of the finished chocolate bar or piece facing the retaining/casting belt.

Figure 2:
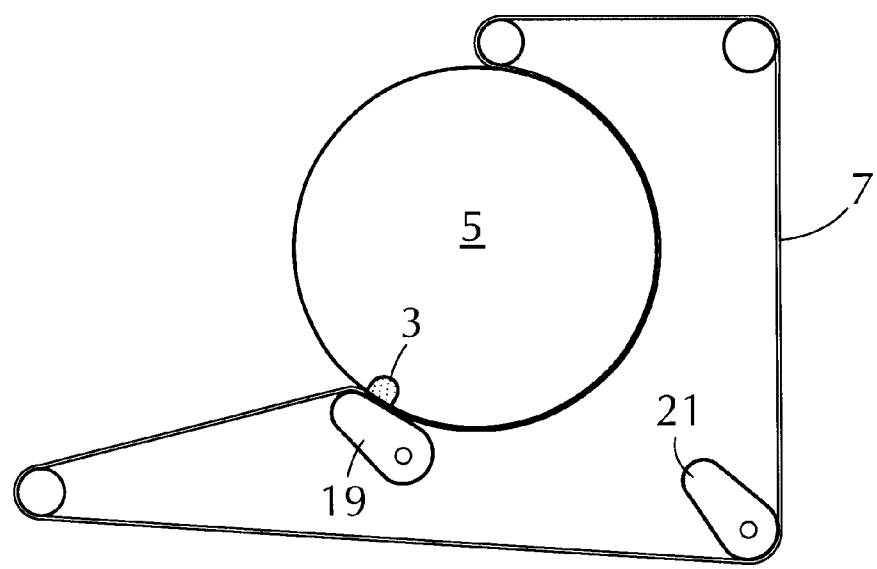
FIG. 2 depicts a system of cams in cooperation with the rotary mold and retaining/casting belt according to an embodiment of the invention.

Finished molded chocolate is removed from the recess 3 onto the belt 7. The condition of the chocolate as it is removed is important. If the chocolate has not sufficiently set, then the bar or piece will not retain its integrity. Preferably, the chocolate removed from the recess 3 has an average temperature of less than about 25° C., more preferably less than about 22° C. and most preferably between about 15° C. and about 20° C. The temper of the chocolate as well as its fat content will determine the temperature at which the chocolate obtains a sufficiently integral state permitting removal from the rotary mold. In some embodiments, the retaining/casting belt is maintained in a pressing relationship with the partially set chocolate in the recess after the recess advances past the 6 o'clock position. The adhesion of the belt to the chocolate in the recess as the belt pulls away from the rotary mold creates a perpendicular force on the partially set chocolate facilitating its removal from the recess. Any suitable means may be provided to maintain the retaining/casting belt in contact with the rotary mold in this fashion. A cam 19 situated under the retaining/casting belt in the vicinity of the rotary mold, for example, may periodically force the belt against the wheel and then release, while another cam 21 takes up slack in the retaining/casting belt created by this movement, as shown in FIGS. 2 and 3. A system of cams operating with the belt in this manner keeps the belt in contact with the chocolate past the 6 o'clock position, allowing for improved removal of the chocolate, owing to the greater force available for removal of the chocolate at that position.

In connection with the temperature of the molded chocolate as it is removed from the rotary mold, by "average temperature" is meant a temperature that would be measured by a temperature probe if the probe were inserted into the chocolate and the chocolate piece were allowed to equilibrate insulated from the environment.

The recess must also be sized so that the chocolate can be removed from the recess. As with conventional chocolate molding techniques, a release angle of greater than about 7 degrees from the vertical is generally provided to permit the chocolate to slide out of the recess. More preferably, the release angle of the recess used in connection with the rotary mold will be greater than about 8 degrees. Most preferably, the release angle will be greater than about 10 degrees.

In some instances the product may be removed from the wheel as a continuous web of chocolate, which may be textured. In some preferred embodiments, a thin web produced in this manner has a thickness on the order of 1/32 inch (0.08 cm) up to about 1/4 inch (0.635 cm), and has a lace-like pattern made up of chocolate and empty spaces. Highly-designed, non-random and readily-reproducible chocolate structures can be made according to the invention. The artisan will appreciate that a molded chocolate web having these characteristics cannot be molded using conventional techniques.

Within these general parameters, the depth of the recess is not particularly limited and is generally between about 1/32 inch (0.08 cm) and about 1 inch (2.54 cm). Likewise, the width of the recess may vary widely, up to 2 inch (5.08 cm) or more. Working embodiments have used a recess 3/8 inch (0.95 cm) deep by 1 inch (2.54 cm) wide. One of the advantages of the continuous molding method of the present invention is that pieces having a greater ratio of width to thickness, and having finer overall structural detail can be easily obtained, as compared with the prior art.

The temperature of the recess and speed of rotation of the rotary mold are set to obtain a partially solid (plastic) chocolate strip exiting the bottom of the mold. The continuous strip may then be cut into desired lengths by guillotine cutter 9, further cooled in conventional cooling tunnels, and packaged. However, as mentioned above, the size of the recess is not particularly limited and instead of a continuous strip, the finished chocolate may be in the form of discrete pieces.

Generally, an apparatus according to the invention will have a dehumidifier proximate the wheel and retaining/casting belt to condition the air around the molding chocolate. Cooling means underneath the retaining/casting belt, as described above, further set the chocolate after it is removed from the rotary mold.

Generally, in some instances, it will be necessary to provide further thermal conditioning of the molded chocolate pieces to ensure proper stability of the fat phase. For example, cocoa butter based chocolate may require conditioning in a "cooling" tunnel after demolding to allow proper crystal formation, thus ensuring bloom stability. Such conditioning also allows any more liquid regions in the center of a molded piece to fully and properly solidify. Most preferred temperature conditioning comprises cooling at between about 15° C. and about 18° C. for about 10 minutes.

Products made according to the methods of the present invention, and molded using the apparatus according to the invention, include chocolate pieces having uniform composition throughout and made from a single deposition into a rotary mold. Other products according to the invention are products in which different types of chocolate (such as light and dark chocolate), or chocolate in combination with other food materials are co-deposited from the same or different sources into the rotary mold. Other variations and modifications that would be apparent to one of ordinary skill in the art are considered within the scope of the appended claims.

EXAMPLES

The following examples are illustrative of some of the products and methods of making the same falling within the scope of the present invention. They are, of course, not to be considered in any way limiting of the invention. Numerous changes and modifications can be made with respect to the invention within the scope of the appended claims.

Example 1

DOVE® Milk Chocolate, a commercially available milk chocolate, was melted and tempered in a Savage Bros. Co. Batch Tempering System. The chocolate was cooled from 45° C. to 28° C. to produce cocoa butter crystals of stable and unstable polymorphs. The tempered chocolate was then warmed slightly to 31° C. to melt out the unstable crystals. The tempered chocolate was at 31° C. and had a temper level of 6 CTU (OF) and −0.5 slope as determined by Tricor Tempermeter Model 501. The chocolate was then pumped to the rotary molding device.

The rotary molding device consisted of an 8 inch diameter, metallic wheel, which was cooled with coolant having a temperature of 5° C. and rotated at 0.435 rpm. A groove was cut into the wheel with overall dimensions of 1 inch wide and ⅜ inch deep and a wall taper of 7°. The chocolate was fed into the groove through a pipe fitted flush against the rotating wheel. The chocolate was contained in the groove by a solid, polyurethane-coated belt, which was wrapped against, and rotated concurrent with, the rotating wheel from the 12 o'clock position to the 6 o'clock position. At the 6 o'clock position, the solid chocolate strip released from the wheel and was carried away from the wheel on the conveyor belt. The continuous chocolate strip was then cut into sections to form a chocolate bar. The belt carried the chocolate bar over a platen under the conveyor belt that was cooled to −10° C. by recirculating cooling media. The platen set the bottom of the chocolate bars so they would release from the belt. The bars were then transferred to a Sollich cooling tunnel.

The cooling tunnel was comprised of one section with an air temperature of 15° C. The residence time in the tunnel was 10 minutes. The resultant finished chocolate bar exiting the tunnel had a fair to good glossy, bloom stable surface.

Example 2

Chocolate comprised as set forth in Example 1 was pumped to the molding device as comprised in Example 1 with the exception of the groove in the wheel. In this example, a grid design was cut into the wheel with an array spacing of ¼ inch by ½ inch. The wheel rotated at 0.9 rpm and produced a finished product which was a precision molded regular loose mesh. The resultant finished chocolate mesh exiting the tunnel had a fair to good glossy, bloom stable surface.

Example 3

Chocolate comprised as set forth in Example 1 was pumped to the molding device as comprised in Example 1 with the exception of the groove in the wheel. In this example, the groove was cut to overall dimensions of 2 inches wide and ¼ inch deep with a 7° wall taper. The wheel rotated at 0.9 rpm and was supplied with coolant having a temperature of 1° C. The resultant finished chocolate exiting the tunnel had a fair to good glossy, bloom stable surface.

Example 4

Chocolate comprised as set forth in Example 1 was pumped to the molding device as comprised in Example 1 with the exception of the groove in the wheel. In this example, individual cavities were cut into the wheel to resemble an "M&M's"® Brand Character. The wheel rotated at 1.6 rpm and was supplied with coolant having a temperature of −10° C. The resultant finished chocolate pieces exiting the tunnel had a fair to good glossy, bloom stable surface.

We claim:

1. An apparatus for continuously molding chocolate products comprising:

a hollow substantially cylindrical rotary mold having an interior cavity and having at least one recess on a radial surface portion of said rotary mold, said recess having an opening and a surface area;

a motor to impart rotational motion to said substantially cylindrical rotary mold;

conduits leading to and from said interior cavity for connecting said interior cavity with a coolant source;

a feeder for depositing liquid chocolate to said recess;

a retaining/casting belt positioned to maintain said liquid chocolate within said recess and adapted for continuous motion in unison with said rotational motion of said rotary mold;

wherein said opening has an area and the ratio of the surface area of the recess to the area of the opening is less than about 3:1, and wherein a sidewall of said recess makes an angle of greater than about 7 degrees with respect to a line perpendicular to said radial surface of said rotary mold.

2. The apparatus of claim 1, further comprising a second cavity proximate said retaining/casting belt, and conduits leading to and from said second cavity to continuously circulate coolant to and from said cavity capable of reducing the temperature of said retaining/casting belt.

3. The apparatus of claim 1, wherein said rotary mold has a metallic surface.

4. The apparatus of claim 1, wherein said at least one recess is a single continuous groove.

5. The apparatus of claim 1, further comprising a system of cams for maintaining said retaining/casting belt in contact with said chocolate within said recess after said chocolate in contact with said retaining/casting belt passes a 6 o'clock position of said rotary mold.

* * * * *

UNITED STATES PATENT AND TRADEMARK OFFICE
CERTIFICATE OF CORRECTION

PATENT NO. : 6,302,677 B1
DATED : October 16, 2001
INVENTOR(S) : James M. Suttle et al.

It is certified that error appears in the above-identified patent and that said Letters Patent is hereby corrected as shown below:

Column 6,
Line 30, "be" should be deleted.

Column 8,
Line 61, "(OF)" should read -- (°F) --.

Signed and Sealed this

Second Day of April, 2002

Attest:

JAMES E. ROGAN
Attesting Officer     Director of the United States Patent and Trademark Office